US010760549B2

(12) United States Patent
Kuppagadde Sheshadri Rao (10) Patent No.: US 10,760,549 B2
(45) Date of Patent: Sep. 1, 2020

(54) METHOD AND SYSTEM FOR CONFIGURING WIND TURBINES

(71) Applicant: Siemens Wind Power A/S, Brande (DE)

(72) Inventor: Nagaraja Kuppagadde Sheshadri Rao, Karnataka (IN)

(73) Assignee: SIEMENS WIND POWER A/S, Brande (DK)

( * ) Notice: Subject to any disclaimer, the term of this patent is extended or adjusted under 35 U.S.C. 154(b) by 0 days.

(21) Appl. No.: 15/837,196

(22) Filed: Dec. 11, 2017

(65) Prior Publication Data

US 2018/0163701 A1 Jun. 14, 2018

(30) Foreign Application Priority Data

Dec. 14, 2016 (DE) .......................... 10 2016 124 395

(51) Int. Cl.
| | |
|---|---|
| *G05D 3/12* | (2006.01) |
| *G05D 5/00* | (2006.01) |
| *G05D 9/00* | (2006.01) |
| *G05D 11/00* | (2006.01) |
| *G05D 17/00* | (2006.01) |

(Continued)

(52) U.S. Cl.
CPC ............. *F03D 7/048* (2013.01); *F03D 7/046* (2013.01); *F03D 17/00* (2016.05); *G05B 19/0426* (2013.01); *F05B 2260/84* (2013.01); *F05B 2270/20* (2013.01); *F05B 2270/802* (2013.01);

(Continued)

(58) Field of Classification Search
CPC .......... F03D 7/048; F03D 17/00; F03D 7/046; G05B 19/0426; G05B 2219/2619; F05B 2260/84; F05B 2270/20; F05B 2270/802
See application file for complete search history.

(56) References Cited

U.S. PATENT DOCUMENTS

| | | | |
|---|---|---|---|
| 10,260,481 B2 * | 4/2019 | Wilson | .................... F03D 17/00 |
| 2011/0145277 A1 * | 6/2011 | Gadre | .................... F03D 17/00 |
| | | | 707/769 |

(Continued)

FOREIGN PATENT DOCUMENTS

| | | |
|---|---|---|
| EP | 2372479 A1 | 10/2011 |
| EP | 2352917 B1 | 10/2013 |
| WO | WO 2014202079 A1 | 12/2014 |

OTHER PUBLICATIONS

Extended European Search Report for EP Application No. 17204168.3, dated May 24, 2018.

*Primary Examiner* — Zhipeng Wang (74) *Attorney, Agent, or Firm* — Schmeiser, Olsen & Watts LLP (57) ABSTRACT

A method and system of configuring wind turbines is provided. The method and system includes generation of a plurality of configuration profiles. Thereafter, one of the configuration profiles is set as the active configuration profile and the rest of them are stored as shadow configuration profiles. Further, the performance of the active configuration profile and the shadow configuration profiles are monitored. Based on the performance of the configuration profiles, a candidate configuration profile is chosen. Further, a delta configuration profile is generated by eliminating the duplicate parameters from the candidate configuration profile and the active configuration profile. Further, the active configuration profile is updated with the delta configuration profile.

15 Claims, 9 Drawing Sheets

(51) Int. Cl.
*F03D 7/04* (2006.01)
*G05B 19/042* (2006.01)
*F03D 17/00* (2016.01)

(52) U.S. Cl.
CPC ..... *G05B 2219/2619* (2013.01); *Y02E 10/723* (2013.01)

(56) References Cited

U.S. PATENT DOCUMENTS

| | | | |
|---|---|---|---|
| 2011/0309621 A1* | 12/2011 | Nielsen | F03D 7/0224 290/44 |
| 2012/0139244 A1* | 6/2012 | Bonnet | F03D 7/02 290/44 |
| 2015/0252786 A1* | 9/2015 | Tiwari | F03D 7/04 416/1 |
| 2015/0278405 A1* | 10/2015 | Andersen | G06F 17/5009 703/18 |
| 2016/0084233 A1* | 3/2016 | Evans | F03D 17/00 73/112.01 |
| 2016/0333854 A1* | 11/2016 | Lund | F03D 7/047 |
| 2016/0333855 A1* | 11/2016 | Lund | F03D 7/048 |

* cited by examiner

METHOD AND SYSTEM FOR CONFIGURING WIND TURBINES

CROSS-REFERENCE TO RELATED APPLICATIONS

This application claims priority to German application No. DE 10 2016 124 395.7, having a filing date of Dec. 14, 2016, the entire contents of both of which are hereby incorporated by reference.

FIELD OF TECHNOLOGY

This following relates to method and system for configuring wind turbines. More particularly, embodiments of the invention relates to a method for automatically configuring wind turbines based on a change in operating conditions.

BACKGROUND

A wind park may include a number of wind turbines. Wind turbines generally have a life term of 20 years. The wind turbines have a variety of components and sensors which need to be configured for optimal operation of the wind turbines. After commissioning, the wind turbines need to be serviced periodically which may involve replacement of hardware, software/firmware upgrades and configuration updates. The configuration updates are important for wind turbines as it is critical for optimum performance, maximizing energy production and longevity of the wind turbine. Currently, the components of the wind turbines may be configured manually. For example, a site technician may manually connect to every wind turbine and configure the wind turbines. In an instance, the site technician may connect a handheld configuration device to a port associated with the wind turbine and configure various components of the wind turbine by inputting values from the handheld device. Further, the wind turbines may be configured via a central server which pushes configuration files to all the wind turbines in a wind park so that the wind turbines are configured for preset values.

During the operation of the wind turbine, it may happen that certain critical parameters, for example, the environmental parameters, may change which may affect the output of the wind turbine. In the current scenario, the site technician may have to connect to each turbine manually and change the configuration based on the change in environmental parameters. The aforementioned task can be a highly time consuming. Further, the field technician may have to change the configuration every time there is a change in the critical parameter, such as environmental parameters, which may affect the output of the wind turbines in the wind farm.

Therefore, there is need for a system where the configuration of the turbine is automatically changed based on the changes in the critical parameters. Further, there is a need for a system which changes the configuration of the wind turbines without the need for manually changing the configuration. The need for manually changing the configuration may lead to reduced efficiency of wind turbines and may decrease the overall production of the wind farm.

SUMMARY

An aspect relates to a method for automatically configuring the wind turbine and a corresponding system is disclosed. In accordance with an embodiment, the method of configuring a wind turbine automatically the method comprises generating a plurality of configuration profiles for a wind turbine, wherein the configuration profiles include a plurality of parameters and a corresponding value. For example, the parameters may include setting for features such associated with the rotor, gearbox, generator, blade, nacelle and the like. Further, the method includes assigning one of the configuration profiles as an active configuration profile. The active configuration profile is the configuration under which a wind turbine is currently operating. Further, the method includes monitoring the output performance of the wind turbine operating with the active configuration profile.

In an embodiment, the configuration profiles, other than the active configuration profile, are stored as shadow configuration profiles. The shadow configuration profiles may include the same parameters as the active configuration profile but with different values.

In another embodiment, the response of the shadow configuration profiles are evaluated based on real-time inputs received at the wind turbine, wherein the real-time inputs comprises inputs that are associated with the operating environment of the wind turbine. For example, the real-time inputs may include wind speed, wind direction and ambient temperature.

Further, the output of the wind turbine operating in the active configuration profile is compared with that of the outputs of the shadow configuration profiles. The output of the shadow configuration profile varies based on the critical set of parameters and the corresponding values. The parameters in the configuration profile are classified into critical set of parameters based on one or more key performance indicators associated with the output of the wind turbine. For instance, the critical set of parameters may include parameters which are vital for operating the wind turbine in a smooth manner without any hazard. For example, the critical set of parameters may include speed of the rotor, temperature of the gear box and the like. Thereafter, a candidate configuration profile is selected from a group of active configuration profile and the one or more shadow configuration profiles based on the comparison. For instance, for a given set of real time inputs, the power output of the active configuration profile may be less than that of one of the shadow configuration profiles. In that case, the active configuration profile is updated with the configuration profile whose performance is better than the active configuration profile.

In an embodiment, the response of the shadow configuration profiles is evaluated by testing the response of the shadow configuration profiles by inputting the real-time inputs received at the wind turbine. For example, the models of shadow configuration profiles may be tested virtually using simulation software. The shadow configuration profiles may be tested using the computing resources available at the wind turbine. In another case, the shadow configuration profiles may be tested at a central facility and the results may be sent back to the device associated with the wind turbine.

In another embodiment, a candidate configuration profile is selected from the group of active configuration profile and the one or more shadow configuration profiles based on one or more key performance indicators associated with the wind turbine. For example, the key performance indicators may include power output of the wind turbine.

In yet another embodiment, replacing the active configuration profile with the selected configuration profile comprises comparing the plurality of parameters in the active configuration profile and the candidate profile. Further, a delta configuration profile is generated by eliminating one or more duplicate parameters. The duplicate parameters may be the parameters which have same value in both active configuration profile and the shadow configuration profile. Generally, there are few thousands of parameters associated with a configuration profile. Out of these parameters, some may be classified as critical set of parameters based on the impact of the parameter on the wind turbine. Further, the delta configuration profile is set as the active configuration profile in the wind turbine.

Another aspect of embodiments of the invention provides a system of configuring a wind turbine automatically, wherein the wind turbine is a part of a plurality of wind turbines in a wind farm, the system comprising a processor, a memory coupled with the processor, wherein the memory comprises configuration profile generation module, configuration profile processing module, configuration profile evaluation module and a configuration profile activation module.

In an aspect of embodiments of the invention, the configuration profile generation module is adapted to generate a plurality of configuration profiles for a wind turbine. The configuration profiles comprise a plurality of parameters and a corresponding value. The configuration profile is a file which is administered to the wind turbine for setting up the wind turbine for operation. The configuration profile sets limit on various parameters of the wind turbine which controls the operation of the wind turbine. Generally, there are thousands of parameters which need to be set within a wind turbine in order to set the wind turbine into operation. These parameters are available in the configuration profile and a technician can administer the same to a wind turbine. As there are a many parameters there may not be a single configuration which provides the best result at any given time. Therefore, the configuration profile generates a plurality of configuration profiles with different values to the parameters.

In another aspect, the configuration profile processing module is adapted to assign one of the configuration profiles as an active configuration profile. The configuration profile processing module is adapted to evaluate the real time inputs to the turbine and select one of the configuration profiles from the generated configuration profiles to be assigned as the active configuration profile. Further, the configuration profile processing module is further adapted to monitor the output performance of the wind turbine operating with the active configuration profile. The configuration profile processing module may be evaluate the outputs of active configuration profile and the shadow configuration profiles based on the same real time inputs for which the turbine is operating. Furthermore, the configuration profile processing module is adapted to store the configuration profiles, other than the active configuration profile, as shadow configuration profiles. The shadow configuration profiles are like a backup profiles which may be used when the active configuration profile is not providing the required levels of output.

In another aspect, the system includes the configuration profile evaluation module adapted to evaluate the response of the shadow configuration profiles based on real-time inputs received at the wind turbine. The real-time input comprises inputs that are associated with the operating environment of the wind turbine. For example, the real time inputs may include wind speed, wind direction, temperature and the like.

Further, the configuration profile evaluation module is adapted to compare the output of the wind turbine operating in the active configuration profile with that of the outputs of the shadow configuration profile. With time, the real-time inputs of the wind turbine may change. Parameters such as wind speed, wind direction and temperature may change. In such as scenario, outputs from any of the shadow configuration profile may be higher than that of the active configuration profile. In such a case, the configuration profile evaluation module is adapted to select a candidate configuration profile from a group of active configuration profile and the one or more shadow configuration profiles based on the comparison. In case a better performing shadow configuration profile is selected, the configuration profile activation module is adapted to update the active configuration profile with the selected configuration profile.

In a further aspect of embodiments of the invention, the configuration profile evaluation module is further adapted for testing the response of the shadow configuration profiles by inputting the real-time inputs received at the wind turbine. For example, the configuration profile evaluation module may test the shadow configuration profiles on a remote computing unit or using the computing resources available with the wind turbine. The models of the shadow configuration profile may be simulated using virtual wind turbines and the output may be evaluated.

In yet another aspect, the configuration profile evaluation module is adapted to compare the output of the active configuration profile with that of the outputs of the shadow configuration profile. The outputs of the shadow configuration profiles vary based on the critical set of parameters and the corresponding values.

In yet another aspect, the configuration profile evaluation module is adapted to compare the outputs of the shadow configuration profiles and the active profiles based on forecasted inputs. Thereafter, the best performing configuration profile is selected based on the outputs received to the forecasted inputs. The forecasted inputs may include forecasted weather data such as wind speed and wind direction.

In a further aspect, the configuration profile activation module is adapted to generate a delta configuration profile by eliminating one or more duplicate parameters. The configuration profiles have a lot of duplicate parameters with similar values. Such parameters can be eliminated. Thereafter, the delta configuration profile is set as the active configuration profile in the wind turbine. A candidate configuration profile is selected from the group of active configuration profile and the one or more shadow configuration profiles based on one or more key performance indicators associated with the wind turbine. The key performance indicators may include for example, energy output and efficiency.

In yet another aspect of embodiments of the invention, the configuration profile activation module is adapted to compare the plurality of parameters in the active configuration profile and the candidate profile. Thereafter, a delta configuration profile is generated by eliminating one or more duplicate parameters. Further, the delta configuration profile is set as the active configuration profile in the wind turbine.

The above mentioned and other features of embodiments of the invention will now be addressed with reference to the accompanying drawings of embodiments of the present invention. The illustrated embodiments are intended to illustrated, but not limit embodiments of the invention.

BRIEF DESCRIPTION

Some of the embodiments will be described in detail, with reference to the following figures, wherein like designations denote like members, wherein.

BRIEF DESCRIPTION

Various embodiments are described with reference to the drawings, wherein like reference numerals are used to refer like segments throughout. In the following description, for the purpose of explanation, numerous specific details are set forth in order to provide thorough understanding of one or more embodiments. It may be evident that such embodiments may be practiced without these specific details.

Figure 1:
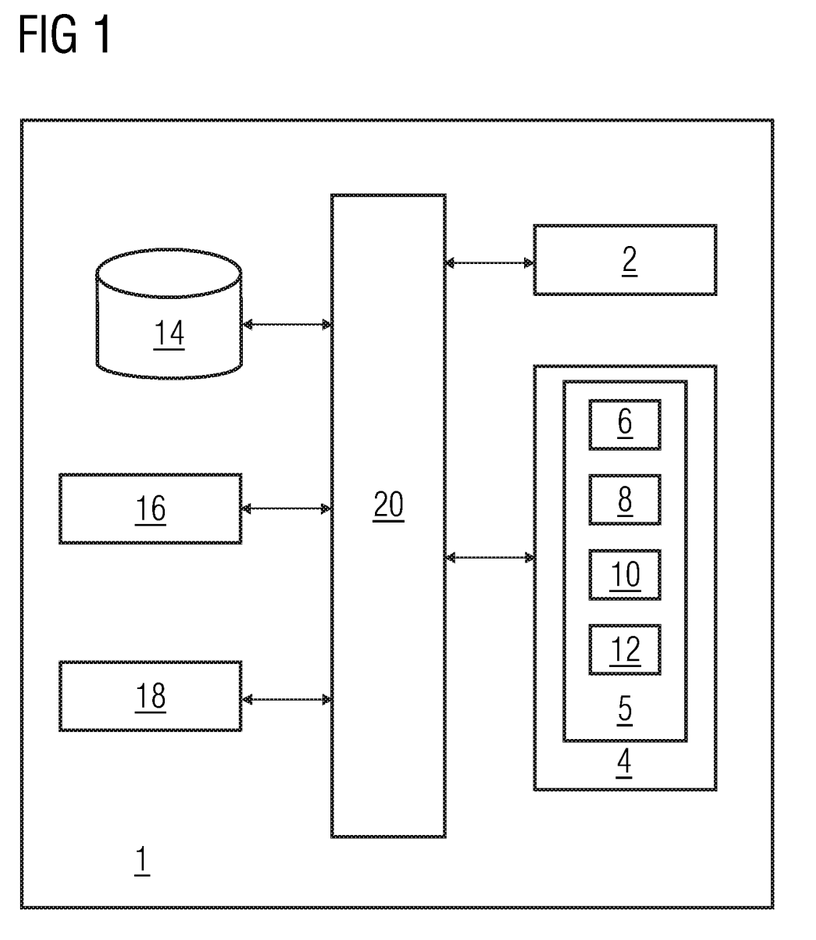
FIG. 1 illustrates an exemplary block diagram of a device configured for automatically changing a configuration profile associated with a wind turbine, in accordance with embodiments of the present invention.

FIG. 1 illustrates an exemplary block diagram of a device configured for automatically changing a configuration profile associated with a wind turbine, in accordance with an embodiment. The device 1 may be a computing device deployed at the site of the wind turbine. Further, the device may be a server at wind farm level wherein the device 1 may control group of wind turbine. In FIG. 1, the computing device 1 comprises a processor 2, a memory 4, a storage unit 14, input/output devices 16 and communication interface 18.

The processor 2, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 10 may also include embedded controllers, such as generic or programmable logic devices or arrays, application specific integrated circuits, single-chip computers, and the like.

The memory 4 may be volatile memory and non-volatile memory. A variety of computer-readable storage media may be stored in and accessed from the memory 4. The memory 4 may include any suitable elements for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, and the like. As depicted, the memory 4 includes a configuration profile management module 5 configured to automatically change the configuration profiled based on one or more parameters. The one or more parameters based on which the configuration profile is changed may include, but are not limited to, change in temperature, change in wind velocity and change in wind direction. The configuration profile management module 5 further includes a configuration profile generation module 6 which generates one or more configuration profiles. The configuration profile generation module 6 causes the processor 2 to determine a critical set of parameters from the plurality of parameters. The critical set of parameters may include the parameters associated with the wind turbines which have direct impact on the performance of the wind turbine. For example, the critical set of parameters may include, but not limited to, temperature of the rotor, orientation of the wind turbine, temperature of the cooling oil and the like. The configuration profile generation module 6 is adapted to assign a range of variables to the critical set of configuration parameters. Thereafter, the configuration profile generation module 6 is configured to generate configuration profiles based on each of the critical set of parameters and the corresponding variables. The configuration profile management module 5 includes the configuration profile processing module 8. In an embodiment, the configuration profile processing module 8 is adapted to assign one of the configuration profiles as an active configuration profile. The configuration profile processing module 8 may assign a particular configuration profile the active configuration profile based on a preliminary analysis of the real time inputs at the wind turbine. The real time inputs may include, but not limited to, the ambient temperature, wind direction, wind speed and the like. Upon assigning one of the generated configuration profiles as active, the rest of the configuration profiles are stored as shadow configuration profiles.

The configuration profile management module 5 further includes the configuration profile evaluation module 10 which is adapted to evaluate the performance of the active and shadow configuration profiles based on real-time inputs received at the wind turbine. The performance may be monitored based on key performance indicators. The configuration profile evaluation module 10 may select a candidate profile from the group of active and the shadow configuration profiles based on the performance.

The configuration profile management module 5 includes a configuration profile activation module 12. The configuration profile activation module 12 is adapted to compare the plurality of parameters in the active configuration profile and the candidate profile. Further, a delta configuration profile is generated by eliminating one or more duplicate parameters in the active configuration profile and the candidate configuration profile. Thereafter, the delta configuration profile is set as the active configuration profile in the wind turbine.

The storage unit 14 may be a non-transitory storage medium configured for storing files and databases. For example, the storage unit 14 contains electrophysiological data of one or more subjects. Further, the storage unit 14 may contain the data such as, but not limited to, historical weather data, performance data of wind turbine and weather forecast data. It can be noted that the aforementioned data may be located at a remote server and may be remotely accessed via a network connection.

Figure 2:
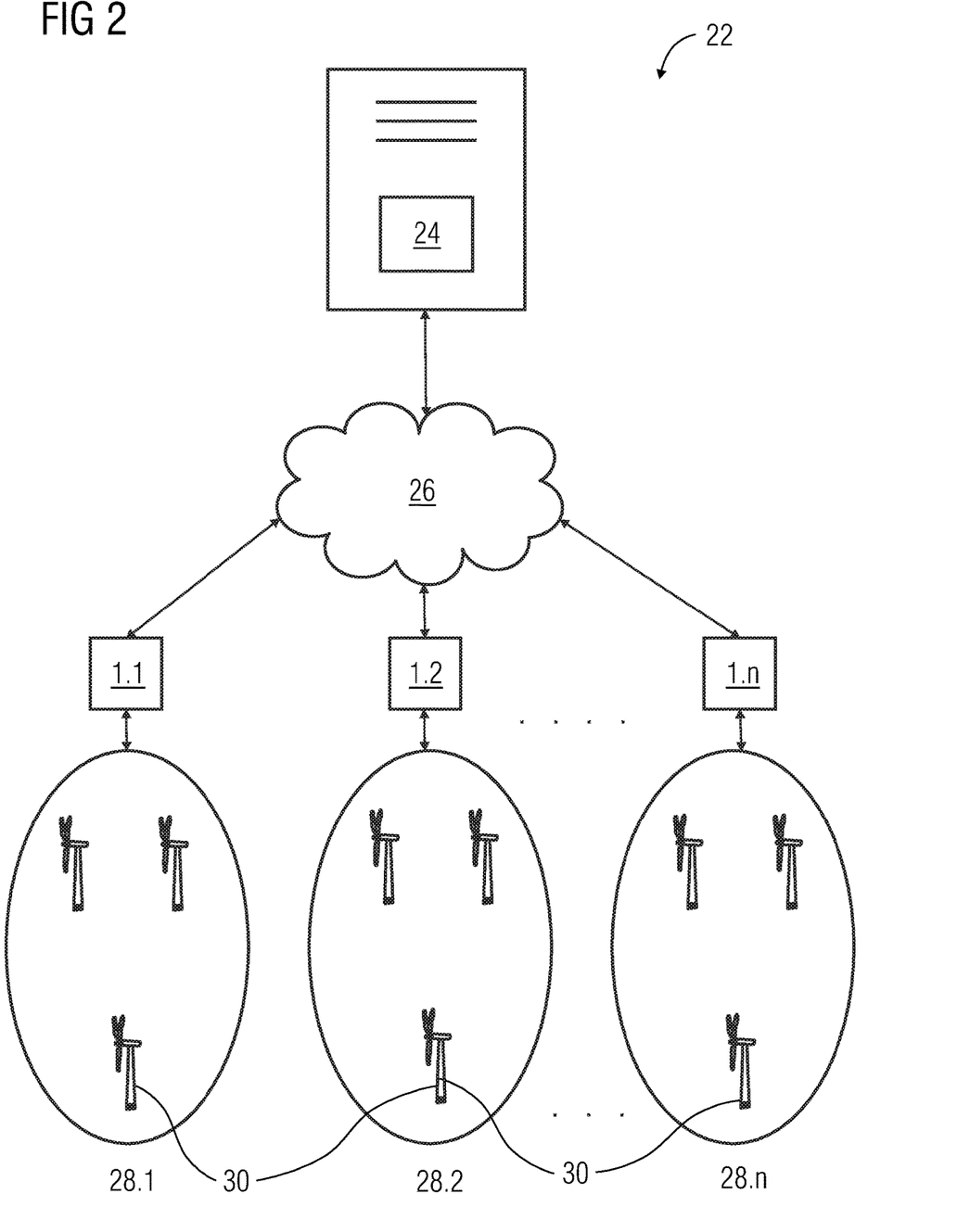
FIG. 2 illustrates an exemplary block diagram of an operating environment of the system for automatically changing the configuration profile associated with the wind turbine, in accordance with embodiments of the present invention.

The input/output devices 16 may include keyboard, keypad, monitor, touch sensitive display screen, mouse and the like. The input device/output devices 16 enable the user to interface with the computing device 1 for inputting data associated with configuration of wind turbines. For example, the input device may enable a technician to load a configuration profile manually to a wind turbine. FIG. 2 illustrates an exemplary block diagram of an operating environment of the system for automatically changing the configuration profile associated with the wind turbine, in accordance with an embodiment. The operating environment includes a server 24, a network 26 and one or more wind farms 28.1-28.*n*. The wind farms include wind turbines such as wind turbine 30. Each wind farm, such as wind farm 28.1-28.*n*, is connected with a single computing device 1 which is configured to manage the configuration profiles of the wind turbines. In this embodiment, the configuration profile management module 5 may be implemented in a memory associated with the server 24 which does all the processing and provides the final inputs to the computing devices 1.1-1.*n*. Thereafter, the computing devices 1.1-1.*n* may execute the inputs received and change the configuration profile accordingly.

Figure 3:
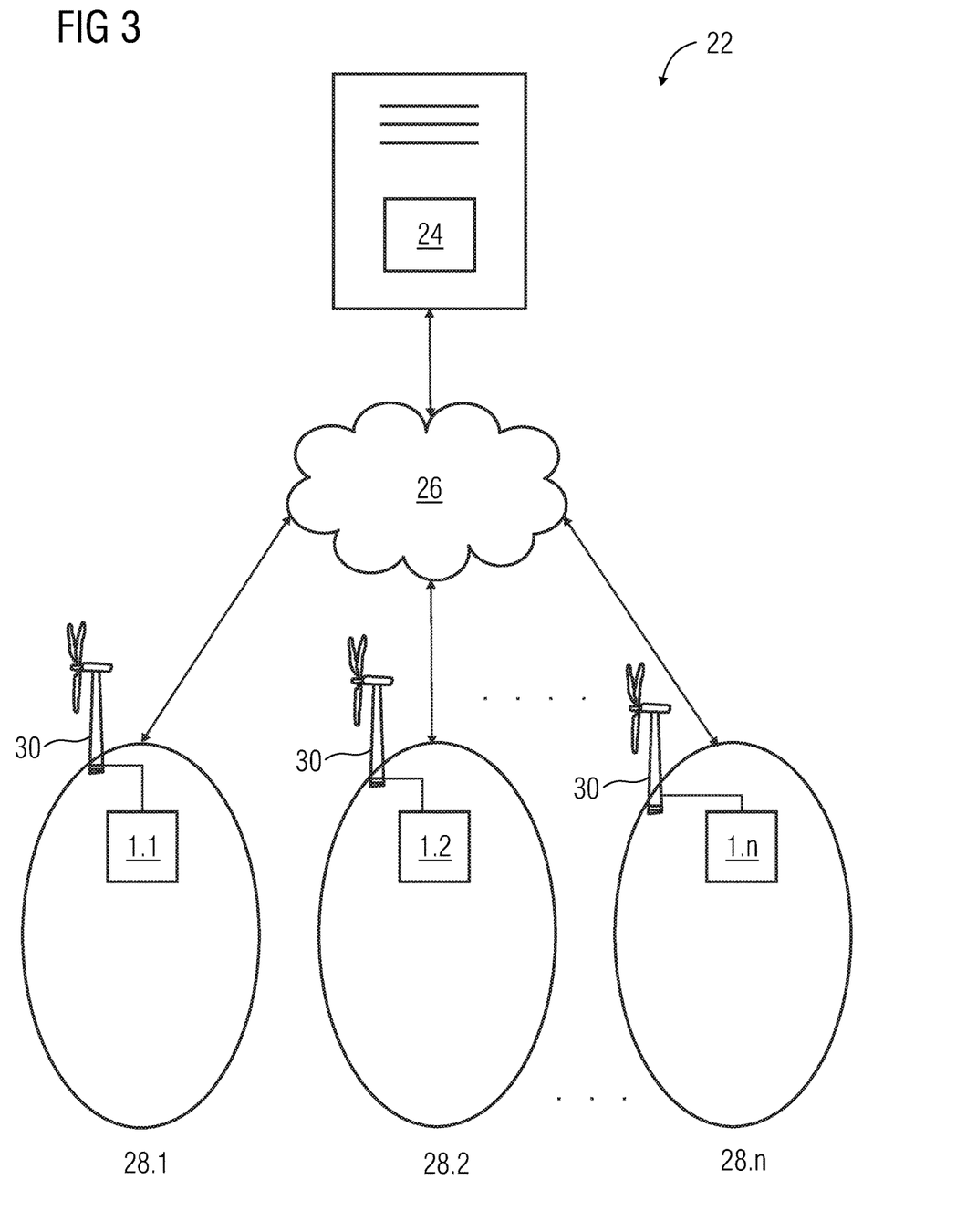
FIG. 3 illustrates an exemplary block diagram of another operating environment of the system for automatically changing the configuration profile associated with the wind turbine, in accordance with embodiments of the present invention.

FIG. 3 illustrates an exemplary block diagram of another operating environment 29 of the system for automatically changing the configuration profile associated with the wind turbine, in accordance with an embodiment. In this operating environment 29, the server 24 is connected to the network 26. Further, the wind farms 28.1-28.*n* are connected to the network 26. Additionally, each wind turbine 30 is associated with the computing device 1. In this scenario, the server 24 may provide input data such as weather forecast to the computing device 1.1-1.*n*. The input data may then be employed to simulate the wind turbine models for the shadow configuration profiles and select a candidate configuration profile. The computing device 1.1-1.*n* may also be connected to the network 26.

Figure 4:
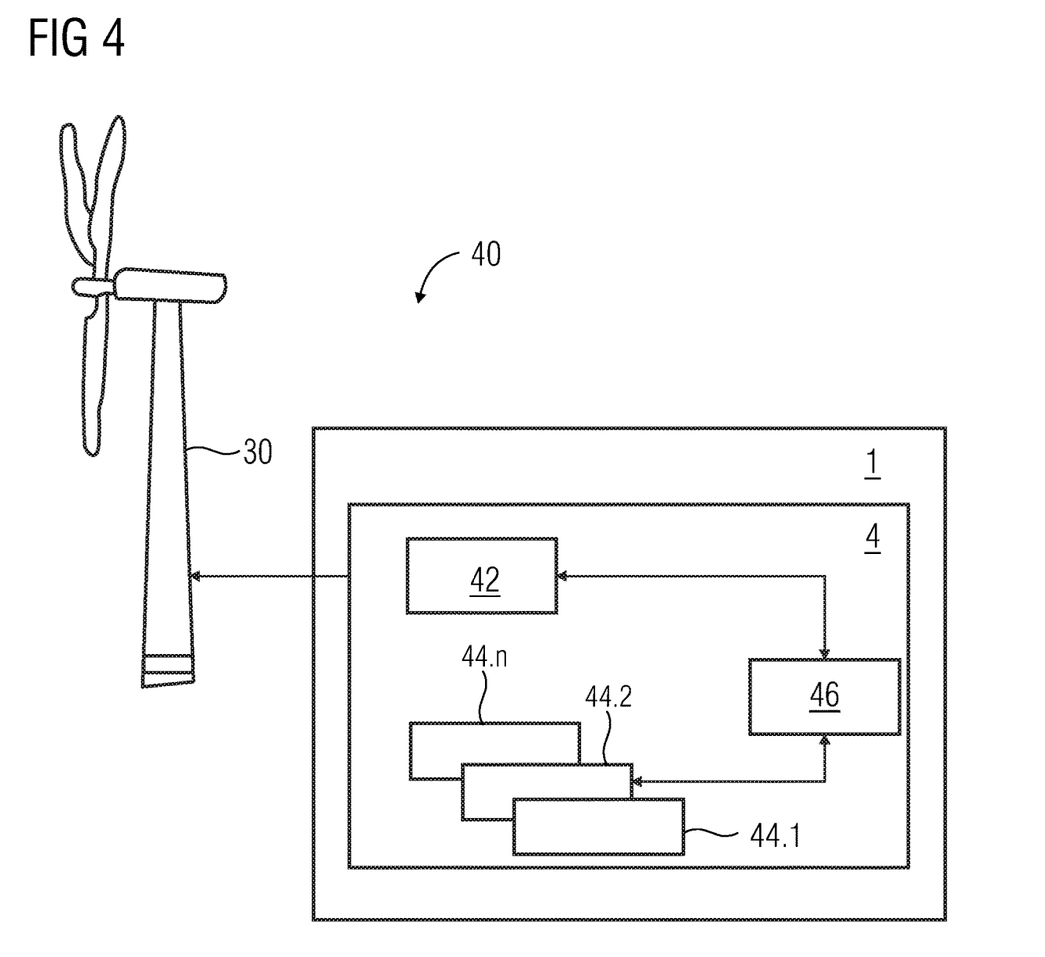
FIG. 4 illustrates an exemplary working of the device for automatically changing the configuration profile associated with the wind turbine, in accordance with embodiments of the present invention.

FIG. 4 illustrates an exemplary working of the device 1 for automatically changing the configuration profile associated with the wind turbine, in accordance with an embodiment. In this embodiment, the wind turbine 30 is connected device 1. The memory unit 4 of device 1 may include configuration profile management module 5 for changing the configuration profile in the wind turbine 30. FIG. 4 further illustrates the process of changing a configuration profile. The wind turbine may be operating with an active configuration profile 42. The configuration profile 44.1-44.*n* are the shadow configuration profiles. The shadow configuration profiles 44.1-44.*n* are evaluated by the configuration profile management module 5 and a candidate configuration profile is chosen. Further, a delta configuration profile 46 is generated which will be used to update the active configuration profile 42 in case the active configuration profile under performs.

Figure 5:
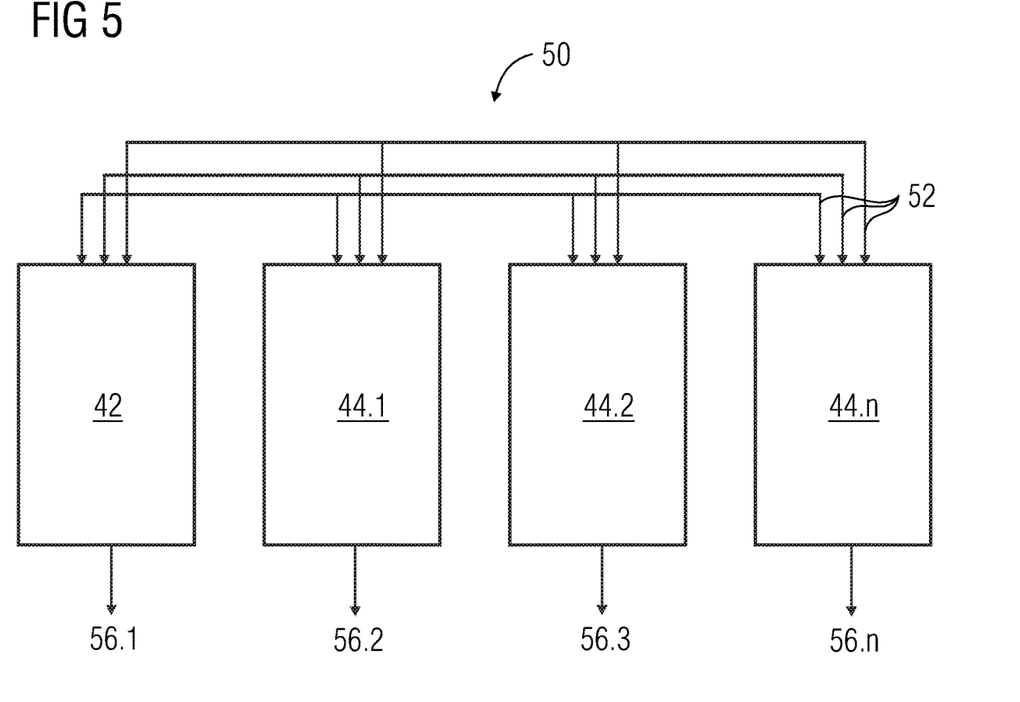
FIG. 5 illustrates the evaluation of the active configuration profile and the shadow configuration profile, in accordance with embodiments of the present invention.

FIG. 5 illustrates the evaluation of the active configuration profile and the shadow configuration profile, in accordance with an embodiment. The performance of the active configuration profile 42 and the shadow configuration profile 44.1-44.2 may be simulated virtually by the device 1. In another embodiment, the simulation can be carried out on the server 24 and the results may be fed back to the computing devices 1.1-1.*n*. Further, the configuration profiles may be tested using real-time inputs 52 obtained from the wind turbine. The real-time inputs may be wind speed, wind direction and ambient temperature.

Figure 6:
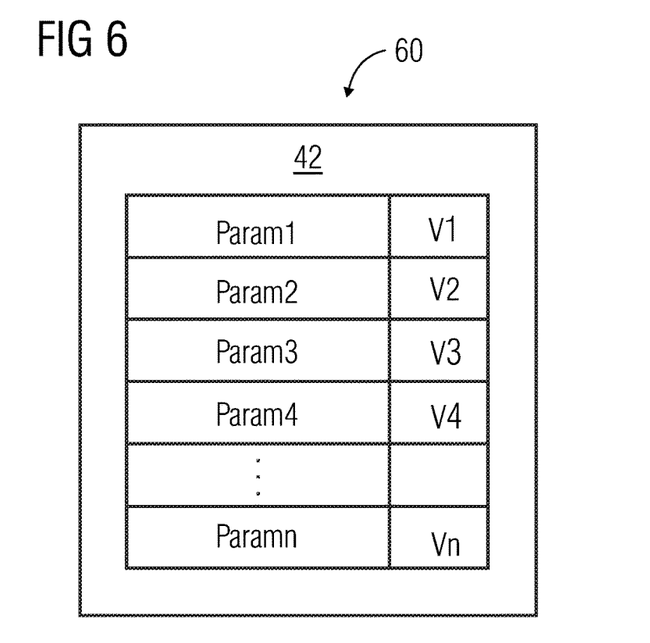
FIG. 6 illustrates a scheme of the configuration profiles, in accordance with embodiments of the present invention.

FIG. 6 illustrates the scheme 60 of the active configuration profile 42 and the shadow configuration profile 44.1-44.*n*, in accordance with an embodiment. The schema for of the configuration profile may be similar for the active configuration profile and the shadow configuration profile. In FIG. 6, the configuration profile 42 may include parameters Param 1-Param n and corresponding values v1-vn. The parameters may include, but are not limited to, a temperature of the gear box, speed of the rotor, temperature of the cooling oil and the like. Likewise, the shadow configuration profiles may include different values for the parameters for the same parameter. For example, Param 1 can have values such as v1.1-v1.*n* in shadow configuration profiles 44.1-44.*n*.

Figure 7:
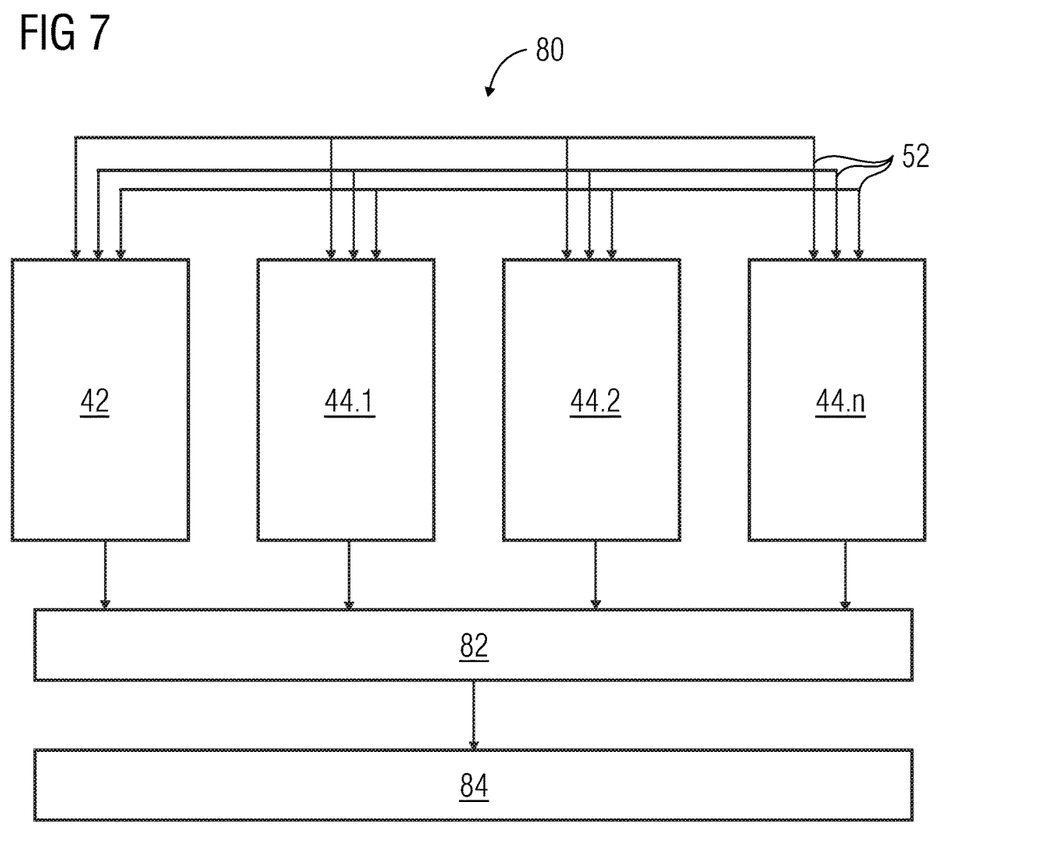
FIG. 7 illustrates an exemplary block diagram depicting the evaluation of the performance of the active configuration and the shadow configuration profiles, in accordance with embodiments of the present invention.

FIG. 7 illustrates an exemplary block diagram 80 depicting the evaluation of the performance of the active configuration and the shadow configuration profiles, in accordance with an embodiment. As mentioned before in conjunction with FIG. 4, the active configuration profile and the shadow configuration profiles are evaluated for the performance based on real time inputs 52 obtained at the wind turbine. The evaluation may be performed remotely on a server, such as server 24, or at the site of the wind turbine. The real-time inputs 52 may include the current and forecasted weather data. The real-time inputs may be given to the active configuration profile 42 and the shadow configuration profiles 44.1-44.*n*. Thereafter, at step 52, the configuration profile evaluation module 10 evaluates the performance of the configuration profiles based on the output. At step 86, based on the output of each of the configuration profiles a candidate configuration profile is chosen to update the active configuration profile 42. In an instance, the best performing configuration profile in some cases may be the active configuration profile 42. In such cases, the active configuration profile 42 is maintained as the active configuration profile.

Figure 8:
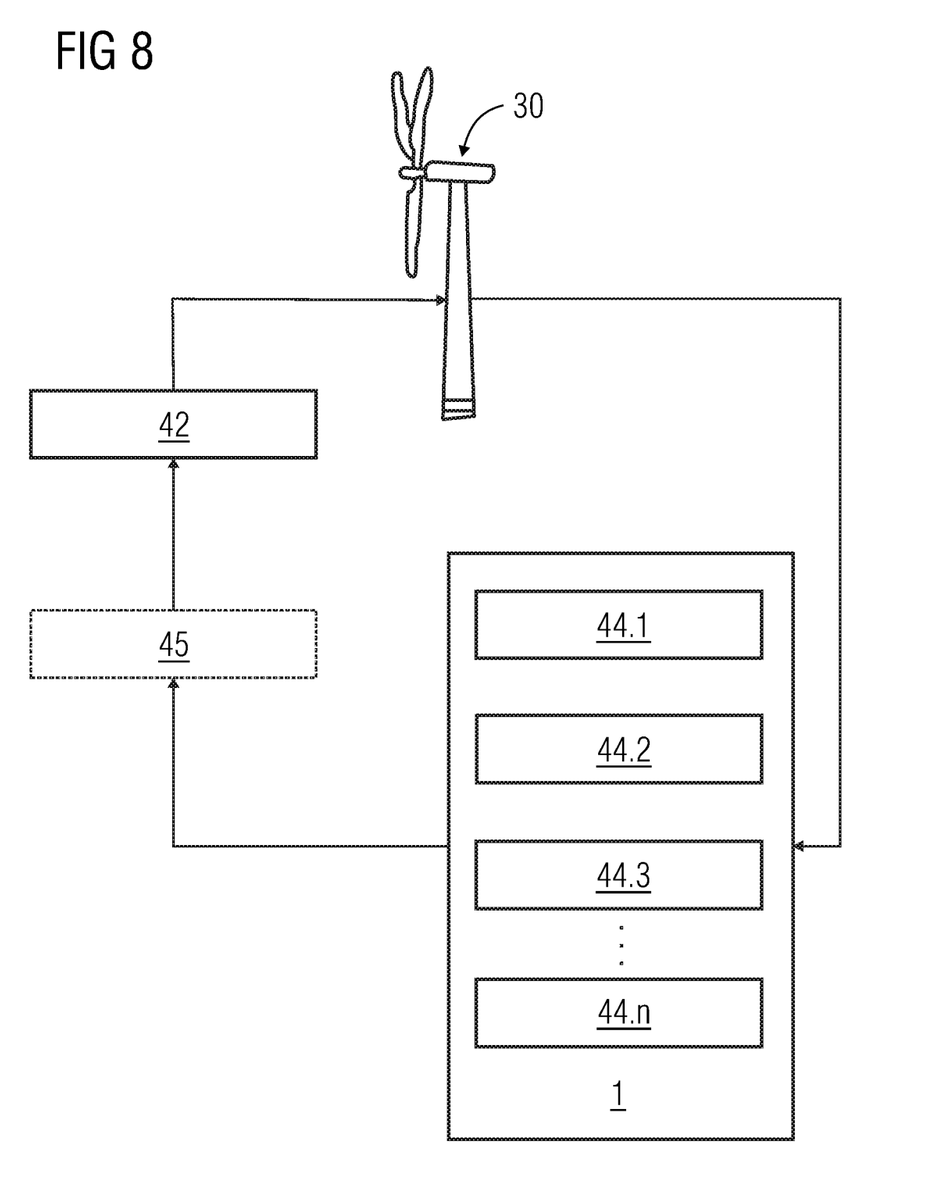
FIG. 8 illustrates an exemplary block diagram of generating a delta configuration profile, in accordance with embodiments of the present invention.

FIG. 8 illustrates an exemplary block diagram of generating a delta configuration profile, in accordance with an embodiment. After selecting the candidate configuration profile for the given input conditions, the configuration profile management module 5 generates a delta configuration profile. The delta configuration profile 45 is generated by eliminating the parameters which have the same values in both the active configuration profile 42 and the candidate configuration profile. The generation of delta configuration profile reduces the time to set-up configuration profile as a majority of the configuration parameters remain unchanged.

Figure 9:
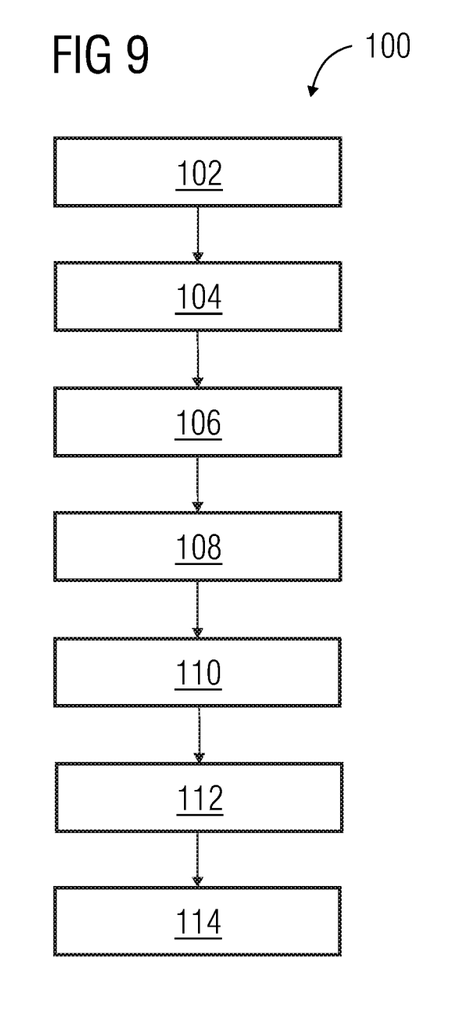
FIG. 9 illustrates an exemplary flow chart of the method steps for automatically changing the configuration profiles associated with a wind turbine, in accordance with embodiments of the present invention.

FIG. 9 illustrates an exemplary flow chart 100 of the method steps for managing the configuration profiles associated with a wind turbine, in accordance with an embodiment. At step 102, a plurality of configuration profiles 44.1-44.*n* for a wind turbine is generated. The configuration profiles 44.1-44.*n* comprise a plurality of parameters and a corresponding value. At step 104, one of the configuration profiles is assigned as an active configuration profile 42 while storing the configuration profiles, other than the active configuration profile, as shadow configuration profiles 44.1-44.*n*. At step 106, the output performance of the wind turbine 30 operating with the active configuration profile 42 is monitored. Thereafter, at step 108, the response of the shadow configuration profiles 44.1-44.n are evaluated based on real-time inputs 52 received at the wind turbine. The real-time inputs comprises inputs are associated with the operating environment of the wind turbine. At step 110, the output of the wind turbine operating in the active configuration profile 42 is compared with that of the outputs of the shadow configuration profile. At step 112, a candidate configuration profile is selected from a group of active configuration profile 42 and the one or more shadow configuration profiles 44.1-44.n based on the comparison. At step 114, the active configuration profile 42 is updated with the selected configuration profile.

Figure 10:
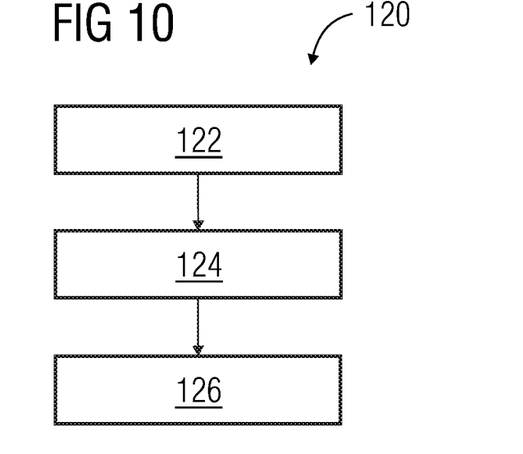
FIG. 10 illustrates a flowchart of the method steps involved in generating a plurality of configuration profiles, in accordance with embodiments of the present invention.

FIG. 10 illustrates a flowchart 120 of the method steps involved in generating a plurality of configuration profiles, in accordance with an embodiment. At step 122, a critical set of parameters from the plurality of parameters (Param 1-Param N) is determined. The critical set of parameters may be determined based on the impact of the parameter values on the performance of the wind turbine. At step 124, a range of values to the critical set of configuration parameters are assigned. Thereafter, at step 126, configuration profiles based on each of the critical set of parameters and the corresponding values are generated.

Figure 11:
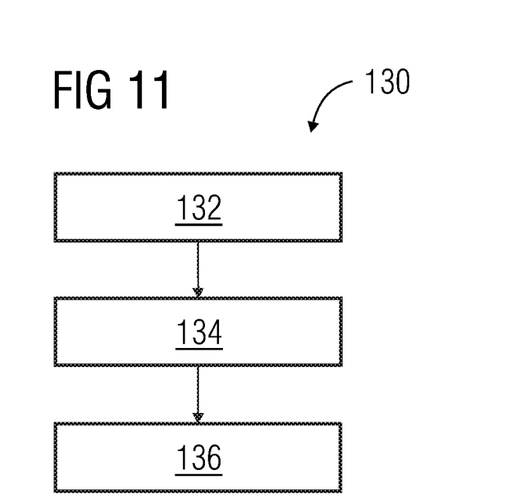
FIG. 11 illustrates a flowchart of the method steps involved in changing a configuration profile, in accordance with embodiments of the present invention.

FIG. 11 illustrates a flowchart 130 of the method steps involved in changing a configuration profile, in accordance with an embodiment. At step 132, the plurality of parameters (Param 1-Param N) in the active configuration profile 42 and the candidate profile are compared with each other. Further, at step 134, a delta configuration profile 45 is generated by eliminating one or more duplicate parameters. Thereafter, at step 136, the delta configuration profile 45 is set as the active configuration profile 42 in the wind turbine.

The advantageous embodiments disclosed herein enables turbine specific profile configuration. The method and system may enable better efficiency of the wind turbines 30 as the configuration is changed based on changing conditions. Further, the changes in the configuration profiles 42, 44.1-44.n are made after testing the output of each of the shadow configuration profiles. The shadow configuration profiles 44.1-44.n may be tested using simulated models of wind turbines before selecting one for replacing the active configuration profile 42. The configuration profiles are changed or updated in real time which results faster adaptation of the turbines 30 to the changing operating conditions.

While the present invention has been described in detail with reference to certain embodiments, it should be appreciated that the present invention is not limited to those embodiments. In view of the present disclosure, many modifications and variations would be present themselves, to those skilled in the art without departing from the scope of the various embodiments of the present invention, as described herein. The scope of the present invention is, therefore, indicated by the following claims rather than by the foregoing description. All changes, modifications, and variations coming within the meaning and range of equivalency of the claims are to be considered within their scope.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

We claim:
1. A method of configuring a wind turbine automatically, wherein the wind turbine is a part of a plurality of wind turbines in a wind farm, the method comprising:
   generating, by a processor of a computing device, a plurality of configuration profiles for the wind turbine, wherein the plurality of configuration profiles comprise a plurality of parameters and a corresponding value;
   assigning, by the processor, one of the configuration profiles as an active configuration profile and storing the plurality of configuration profiles, other than the active configuration profile, as shadow configuration profiles;
   monitoring, by the processor, a performance of the wind turbine operating with the active configuration profile;
   simulating, by the processor, a performance of the shadow configuration profiles based on real-time inputs received at the wind turbine, wherein the real-time inputs comprises inputs that are associated with an operating environment of the wind turbine;
   comparing, by the processor, an output of the wind turbine operating in the active configuration profile with that of outputs of the shadow configuration profiles;
   selecting, by the processor, a candidate configuration profile from the active configuration profile and the shadow configuration profiles based on the comparing; and
   replacing, by the processor, the active configuration profile with the candidate configuration profile to automatically configure the wind turbine based on a change in operating conditions, wherein the replacing the active configuration profile with the candidate configuration profile comprises:
      comparing, by the processor, the plurality of parameters in the active configuration profile and the candidate profile;
      generating, by the processor, a delta configuration profile as a result of the comparing; and
      setting, by the processor, the delta configuration profile as the active configuration profile in the wind turbine.

2. The method of claim 1, wherein generating a plurality of configuration profiles for a wind turbine comprises:
   determining, by the processor, a critical set of parameters from the plurality of parameters;
   assigning, by the processor, a range of variables to the critical set of parameters;
   generating, by the processor, configuration profiles based on each of the critical set of parameters and the corresponding variables.

3. The method of claim 2, wherein the critical set of parameters are determined based on one or more key performance indicators associated with the operation of the wind turbine.

4. The method of claim 1, wherein the simulating the performance of the shadow configuration profiles based on real-time inputs received at the wind turbine comprises:
   testing, by the processor, a response of the shadow configuration profiles by inputting the real-time inputs received at the wind turbine.

5. The method of claim 1, wherein comparing the output of the wind turbine operating with the active configuration profile with that of the outputs of the shadow configuration profile comprises:
   comparing, by the processor, the output of the active configuration profile with that of the outputs of the shadow configuration profile, wherein the outputs of the shadow configuration profiles varies based on a critical set of parameters and the corresponding values.

6. The method of claim 1, wherein selecting a configuration profile from the active configuration profiles and the one or more shadow configuration profiles comprises:
   selecting, by the processor, a candidate configuration profile from the active configuration profiles and the one or more shadow configuration profiles based on one or more key performance indicators associated with the wind turbine.

7. The method of claim 1, wherein the delta configuration profile is generated by eliminating duplicate parameters in the active configuration profile and shadow configuration profiles.

8. A system of configuring a wind turbine automatically, wherein the wind turbine is a part of a plurality of wind turbines in a wind farm, the system comprising:
   a processor;
   a memory coupled with the processor, wherein the memory comprises machine-readable instructions executable by the processor to implement a method comprising:
   generating, by the processor of the system, a plurality of configuration profiles for the wind turbine, wherein the plurality of configuration profiles comprise a plurality of parameters and a corresponding value;
   assigning, by the processor, one of the configuration profiles as an active configuration profile and storing the plurality of configuration profiles, other than the active configuration profile, as shadow configuration profiles;
   monitoring, by the processor, a performance of the wind turbine operating with the active configuration profile;
   simulating, by the processor, a performance of the shadow configuration profiles based on real-time inputs received at the wind turbine, wherein the real-time inputs comprises inputs that are associated with an operating environment of the wind turbine;
   comparing, by the processor, an output of the wind turbine operating in the active configuration profile with that of outputs of the shadow configuration profiles;
   selecting, by the processor, a candidate configuration profile from the active configuration profiles and the one or more shadow configuration profiles based on the comparing; and
   replacing, by the processor, the active configuration profile with the candidate configuration profile to automatically configure the wind turbine based on a change in operating conditions, wherein the replacing the active configuration profile with the candidate configuration profile comprises:
      comparing, by the processor, the plurality of parameters in the active configuration profile and the candidate profile;
      generating, by the processor, a delta configuration profile as a result of the comparing; and
      setting, by the processor, the delta configuration profile as the active configuration profile in the wind turbine.

9. The system of claim 8, further comprising:
   determining, by the processor, a critical set of parameters from the plurality of parameters;
   assigning, by the processor, a range of variables to the critical set of parameters;
   generating, by the processor, configuration profiles based on each of the critical set of parameters and the corresponding variables.

10. The system of claim 8, further comprising:
    testing, by the processor, a response of the shadow configuration profiles by inputting the real-time inputs received at the wind turbine.

11. The system of claim 9, further comprising:
    comparing, by the processor, the output of the active configuration with that of the outputs of the shadow configuration profile, wherein the outputs of the shadow configuration profiles varies based on the critical set of parameters and the corresponding values.

12. The system of claim 8, further comprising:
    comparing, by the processor, the outputs of the shadow configuration profiles and the active profiles based on forecasted inputs; and
    selecting, by the processor, the best performing configuration profile based on the outputs received to the forecasted inputs.

13. The system of claim 8, further comprising:
    generating, by the processor, a delta configuration profile by eliminating one or more duplicate parameters from the active configuration profiles and the shadow configuration profile;
    setting, by the processor, the delta configuration profile as the active configuration profile in the wind turbine; and
    selecting, by the processor, a candidate configuration profile from the active configuration profiles and the shadow configuration profiles based on one or more key performance indicators associated with the wind turbine.

14. The system of claim 8, further comprising:
    selecting, by the processor, the candidate configuration profile from the active configuration profiles and the shadow configuration profiles based on one or more key performance indicators associated with the wind turbine.

15. A system of configuring a wind turbine automatically, wherein the wind turbine is a part of a plurality of wind turbines in a wind farm, the system comprising:
    a processor;
    a memory coupled with the processor, wherein the memory comprises machine-readable instructions executable by the processor to implement a method comprising:
    generating, by the processor of the system, a plurality of configuration profiles for the wind turbine, wherein the plurality of configuration profiles comprise a plurality of parameters and a corresponding value;
    assigning, by the processor, one of the configuration profiles as an active configuration profile and storing the plurality of configuration profiles, other than the active configuration profile, as shadow configuration profiles;
    monitoring, by the processor, a performance of the wind turbine operating with the active configuration profile;
    simulating, by the processor, a performance of the shadow configuration profiles based on real-time inputs received at the wind turbine, wherein the real-time inputs comprises inputs that are associated with an operating environment of the wind turbine;
    comparing, by the processor, an output of the wind turbine operating in the active configuration profile with that of outputs of the shadow configuration profiles;
    selecting, by the processor, a candidate configuration profile from the active configuration profiles and the one or more shadow configuration profiles based on the comparing; and replacing, by the processor, the active configuration profile with the candidate configuration profile to automatically configure the wind turbine based on a change in operating conditions;

generating, by the processor, a delta configuration profile by eliminating one or more duplicate parameters from the active configuration profiles and the shadow configuration profile;

setting, by the processor, the delta configuration profile as the active configuration profile in the wind turbine; and selecting, by the processor, a candidate configuration profile from the active configuration profiles and the shadow configuration profiles based on one or more key performance indicators associated with the wind turbine.

* * * * *